Patented Aug. 28, 1951

2,566,172

UNITED STATES PATENT OFFICE 2,566,172

MANUFACTURE OF ACONITIC ACID

Hoy A. Cranston, Chicago, Ill., assignor to Daniel F. Kelly, Hammond, Ind., as principal trustee No Drawing. Application September 3, 1949, Serial No. 114,060

17 Claims. (Cl. 260—537)

The present invention relates to the conversion of citric acid to aconitic acid and derivatives of aconitic acid.

Aconitic acid is a product having the formula $HOOC.CH_2.C(COOH) = CH.COOH$, derivable from citric by a dehydrating reaction at the position of the double bond. The best known prior art method for such reaction is to use strong aqueous sulfuric acid solution as the dehydrating agent for action on citric acid. The yield is very low. The product is very impure. The difficulty in the reaction lies in the fact that aconitic acid is readily oxidized, and the sulfuric acid is readily reduced, or in other words, the sulfuric acid is an oxidizing acid with respect to aconitic acid.

According to the present invention, the dehydrating reaction is carried out by a process involving a dehydration agent which is non-oxidizing for the aconitic acid, with numerous other advantages pertaining to ease of recovery of the aconitic acid, its purity, and ease of converting it to certain derivatives.

It is the general object of the invention to convert citric acid to aconitic acid in an aqueous liquid vehicle containing essentially a sulfonic acid derivative of the lower alkane hydrocarbons.

It is the general object of the invention to employ as the alkane sulfonic acid a commercial mixture of such sulfonic acids derived from methane, ethane and n-propane.

It is another object of the invention to use an alkane sulfonic acid as a dehydrating medium for converting citric acid to aconitic acid by a procedure permitting reuse of the said medium.

It is another object of the invention to carry out the reaction in a manner to facilitate the recovery of the aconitic acid by crystallization.

Various other and ancillary objects and advantages of the invention will appear hereinafter from the following explanation and examples of the invention.

It is well known in the art that the dehydration reaction involved takes place in the range from 120° C. to 140° C. Below 120° C. the reaction does not occur. At 120° C. it is very slow. At 125° C. it has an appreciable speed. At temperatures upwardly from 140° C. aconitic acid decomposes. This happens also to be the temperature at which the alkane sulfonic acids used in the present invention begin to be damaged, producing color bodies. For suitable speed of reaction, for a margin of safety in practical operation, and for practical simplicity of control, a preferred operating temperature range is herein set forth as 130° C. to 135° C. without any intention to limit the invention to such range.

I have discovered that a suitable mixture of water with one or more of the monosulfonic acid derivatives of methane, ethane and n-propane is an excellent solvent for both citric acid and aconitic acid in the reaction temperature range from 120° C. to 140° C., and further that a suitably aqueous mixture at lower temperatures, well below 100° C., is a good solvent for citric acid and a poor solvent for aconitic acid. I have further discovered that such a mixture, when free from a content of sulfuric acid, is non-oxidizing toward aconitic acid at temperatures up to 140° C.

I have also discovered that such a mixture in proportions giving a reaction mass which refluxes at normal atmospheric pressure in the range from 120° C. to 140° C. is a suitable dehydrating agent for converting citric acid to aconitic acid.

Consequently, such an aqueous mixture essentially of water and a lower alkane monosulfonic acid, or a mixture of such, is an excellent medium in which to convert citric acid to aconitic acid at an elevated temperature for the reaction, and from which at a suitable lower temperature to separate crystals of formed aconitic acid.

Water is essential in the mixture to effect dissolution of the citric acid, and an amount of water is preferred which is sufficient to effect dissolution of all the citric acid present in the reaction vessel. The alkane sulfonic acid not only lowers the aquosity of the reaction mass to accelerate the reaction, but it effectively controls the boiling point for refluxing at atmospheric pressure as a means of controlling the temperature for conduct of the reaction.

I have found that aconitic acid formed may be separated as crystals from the reaction mass at lower temperatures in the range from 25° C. to 40° C. The aquosity controls the extent to which these crystals form, and also the degree to which they may be contaminated with citric acid crystals. For example, where the reaction is carried out with equimolecular amounts of anhydrous citric acid and of alkane sulfonic acid, there should be at least three moles of water in the initial reaction mixture per mole of citric acid in order to effect complete solution of the citric acid in the reaction temperature range of 120° C. to 140° C. This is called "water-citric" ratio of 3. However, a water-citric ratio of 4.5 is preferred in order to effect a reflux temperature in the vicinity of 130° C. to 132° C.

In carrying out this reaction, it has been found that the reaction tends to slow down or approach a sort of equilibrium. Because the aconitic acid may be removed as crystals, the reaction may thus be speeded by the expedient of such removal, and additionally speeded by reinforcing the residual citric acid by addition of more. Thus, the liquid medium may be used over and over to receive citric acid, and to yield aconitic acid. Water is essentially the only ingredient added by the reaction, and this may be removed as explained later. Such water derives from the dehydration reaction, and in the event that monohydrate crystals of citric acid are used as raw material, the water of constitution also dilutes the medium. Both anhydrous citric acid, and the monohydrate form may be used.

The aquosity of the liquid vehicle is not so important for effecting the reaction, so long as there is sufficient water to provide dissolved citric acid, and a suitable deficiency of water with respect to the alkane sulfonic acid to provide a refluxability at a suitable reaction temperature. But for the purpose of readily effecting a recovery of high grade aconitic acid from the reaction mass, water content is important. There may be one water content which is preferred for the reaction, and another water content preferred for the separation. The content for separation depends upon the different solubilities of citric acid and aconitic acid, and also upon the relative speeds at which they crystallize from the reaction mass, diluted with water, or not.

For example, in the case above cited, when the water-citric ratio is 4 to 4½, the reaction comes to an equilibrium in about 6 hours at 135° C. to 130° C. But if this mass is allowed to cool to 25° C. to 40° C., there is a crystallization primarily of aconitic acid, but including some citric acid. If this mass before crystallization is rendered more aqueous, to the extent of a water-citric ratio of 5 to 5.5, the precipitate is substantially free of citric acid crystals and is substantially at a maximum quantity available in such citric-acid free condition, provided: that from complete solution at about 100° C. the cooling and separation are not delayed to an extent of 5 hours or more, for then there is a delayed precipitation of citric acid. When the water-citric ratio is from 5.5 to 6.5, more aconitic acid remains in the solution and does not precipitate, thus lessening the amount which may be recovered. When the water-citric ratio is 7, there is no precipitation of aconitic acid crystals and other means must be employed to recover it, such as selective solvent extraction.

In preferred practice, the reaction is conducted at a lower aquosity than is employed for effecting separation of crystals of aconitic acid. After the reaction is ended, the mass is cooled, preferably to 100° C., for safety, and more water added as calculated to effect the optimum aquosity for crystallization. Then the mother liquor, with or without reinforcement with citric acid and/or alkane sulfonic acid, each to meet the loss by reaction or mechanical adherence to the crystals, is simply heated to distill off water until it has that aquosity refluxing again at the chosen temperature for the reaction step.

With a pure alkane sulfonic acid to work with, no difficulties are encountered. But such pure materials are not available commercially and are costly. There is available as a product of the modern petroleum industry a commercial mixture of sulfonic acids derived substantially from methane, ethane and n-propane. Use of this mixture has failed to give the results above described, and undesired oxidation of the aconitic acid has been observed, with less yield and undesired contamination of the liquid vehicle.

This oxidation has been traced to a small content of sulfuric acid in the commercial product. It is difficult and costly to remove such sulfuric acid, and users of the commercial mixture must contend with it. In the process of the present invention said sulfuric acid impurity may be easily rendered innocuous by addition of an agent to react with it. To form a product of the same nature as the principal constituents, the preferred agent for the purpose is a hydrocarbon which is readily sulfonated by the conditions of conducting the dehydration of citric acid. Toluene and naphthalene are two such hydrocarbons which have been used. These readily form sulfonic acids and thus remove all the sulfuric acid. Excess of the hydrocarbon is easily driven out by volatilization, but retention of it is not harmful. The so-formed sulfonic acids are water-soluble and merely act as harmless or even auxiliary diluents of the alkane sulfonic acids.

In general, the process involves the conduct of the dehydrating reaction by dissolving citric acid in a suitable dehydrating liquid medium of water and alkane sulfonic acid, which medium is non-oxidizing to aconitic acid, at a temperature upwardly from 120° C. at which the reaction is initiated, and below 140° C. at which decomposition of the aconitic acid and of alkane sulfonic acid is initiated. In order readily to control the reaction temperature, it is preferred to limit it to a practical range between the extreme limits of 120° C. and 140° C. Such preferred range is 130° C. to 135° C. Control of temperature is easily effected by adjusting the aquosity of the reaction mass so that it will reflux at normal atmospheric pressure at a temperature in the range from 130° C. to 135° C.

The reaction is not fast at the preferred range of temperature, nor below such, and it does not run to completion. It seemingly approaches an equilibrium state, and in 5 to 6 hours it has progressed sufficiently to warrant recovery of aconitic acid. Rather than to prolong the reaction time, it is more practical to remove formed aconitic acid from the reaction vessel, and stimulate the further progress of the reaction by adding more citric acid. The removal is effected by cooling the mass, whereby aconitic acid crystallizes. The crystals and liquor are separated, as by filtering. Each separated portion has special utility. The liquor will again function on the residual citric acid to convert it to more aconitic acid, but it will also function more rapidly by adding more citric acid. Accordingly, with a set procedure for conduct of the reaction, more citric acid is added in quantity substantially to replace that already converted to aconitic acid. Thus, the liquor is a vehicular dehydrating agent for the reaction, and it may be used repeatedly in a batchwise processing, or used continuously in a suitable continuous cyclic process. There are two major factors to consider in such reuse of the liquor. There are mechanical losses, principally of alkane sulfonic acid, which may be remedied by addition of suitable amounts. But there is a gain in water resulting from the dehydration reaction, and possibly from water of constitution in the crystals of citric acid. In preferred practice there is a gain from addition of water to effect optimum conditions for crystallization. This gain, or this gain and the said loss combined, increase the aquosity of the vehicle, thus lowering its reflux temperature. To keep the reflux temperature in the said preferred operating range, the proportion of water to alkane sulfonic acid is readjusted, This may involve addition of alkane sulfonic acid, or removal of water, or both. Water may be removed by distillation, so long as the vehicle, when it contains citric acid or aconitic acid, or both, does not attain 140° C. To avoid such temperature, or to maintain the vehicle at a temperature not over the preferred top limit of 135° C., the water may be removed by vacuum distillation.

The crystals recovered by separation from the liquor of the cooled reaction mass, are readily purified, and without purification are useful as a raw material for forming aconitic acid esters. In purifying the crystals strong hydrochloric acid is used at a temperature not over 35° C. in the range of strength 30% to 37% by weight. In 37% acid at temperatures below 35° C., the aconitic acid is quite insoluble. Thus, the residual alkane sulfonic acid, aconitic acid and citric acid in the liquid on the separated crystals are washed away into the hydrochloric acid. The crystals now wet with hydrochloric acid are then freed from the acid by volatilizing the acid, without or with heat at a temperature not over 140° C. In the lower strength 30% hydrochloric acid, the aconitic acid is slightly soluble at temperatures below 35° C., and some may be lost in such a purification. Hence, the high strength acid from 34% to 37% strength is preferred for the purification.

The preferred procedure is to mix the wet crystals with an equal weight of 37% hydrochloric acid, then they are preferably heated to, but not over, 35° C., and then cooled and held for about one hour. Then the crystals and liquor are efficiently separated by suction or a centrifuge. The crystals are then dried at 100° C. For higher purity, a second bathing in 37% hydrochloric acid may be practiced before the final drying.

For esterification of aconitic acid, the alkane sulfonic acids function as catalysts. Thus, the aconitic acid crystals as first separated from the reaction liquid, are excellent raw material for the addition of a suitable esterifying monohydric alcohol, such as methyl, ethyl, the propyls, the butyls, the amyls, the hexyls, the heptyls, the octyls, furfuryl, allyl, and many others. Such aconitic acid esters are useful, and presently are in great demand as plasticizers for synthetic rubber and plastics, and as intermediates in the preparation of surface active wetting agents (see Kirk No. 2,375,563, issued May 8, 1945).

*Commercial alkane sulfonic acid.*—There is available in the market a commercial product which is a mixture primarily of monosulfonic acid derivatives of ethane, methane and n-propane. The mixture is a liquid and contains by weight about 2% to 3% of water, and about 3% of sulfuric acid. The water content is useful in the process of the present invention, since more must be added. The sulfuric acid is harmful to the process, because it oxidizes the desired aconitic acid formed. The exact proportions of the three alkane derivatives are variable, but unimportant. The supplier identifies a particular mixture by its average molecular weight, such as 110. The molecular weights of the three principal ingredients are as follows:

| | |
|---|---|
| Methane monosulfonic acid | 95 |
| Ethane monosulfonic acid | 109 |
| n-Propane monosulfonic acid | 123 |

The 3% impurity of sulfuric acid calls for only 2.8 parts of toluene for removal of it from 100 parts of the commercial product. If desired, to the commercial product as a raw material is added 3% by weight of toluene, and the whole employed on the basis that it is all alkane sulfonic acid. In recycling operations this treated raw material is thus used without need for more toluene.

The process is illustrated by the following examples:

*Example 1*

Materials are employed as follows:

| | Parts by weight |
|---|---|
| Ethane monosulfonic acid | 220 |
| Citric acid monohydrate [1] | 210 to 420 |
| Water | 100 |

[1] Or substitute 190 to 380 parts of anhydrous citric acid.

The mass is so composed that it will reflux at a temperature in the range from 130° C. to 135° C. It is so refluxed for 5 to 6 hours with avoidance of 140° C. Then the mass is cooled to 35° C. to 40° C., or below, preferably with stirring, to form crystals of aconitic acid. The crystals are separated, then bathed in 36% hydrochloric acid at not over 35° C., filtered and dried. Per 100 parts of anhydrous citric acid used, the yield is 40 to 45 parts of aconitic acid as a pale yellow powder of purity upwardly from 95%.

The separated liquid is reinforced by adding from 46.5 to 52 parts of citric acid monohydrate or from 42 to 47 parts of anhydrous citric acid, and the process repeated.

*Example 2*

| | Parts by weight |
|---|---|
| Commercial mixed alkane sulfonic acids | 220 |
| Toluene | 10 |
| Citric acid monohydrate [1] | 210 to 420 |
| Water | 100 |

[1] Or substitute 190 to 380 parts of anhydrous citric acid.

The toluene is in excess over the described calculated requirement of 6.2 parts. The procedure is the same as in Example 1. Per 100 parts of anhydrous citric acid used, the yield is 40 to 45 parts of aconitic acid having a purity upwardly from 95%. The unconverted citric acid remains for the second reaction in reuse of the liquor.

*Example 3*

The following example illustrates conduct of the reaction at a favorable aquosity and dilution of the reaction mass with water to a higher aquosity for optimum crystallization conditions, and recycling of the liquor.

The material employed is as follows:

| | Grams |
|---|---|
| Anhydrous citric acid (20 moles) | 3840 |
| Alkane sulfonic acid (commercial mixture) (20 moles) | 2200 |
| Water (80 moles) | 1440 |
| Toluene | 70 |

The above material will reflux at 130° C. to 132° C. at atmospheric pressure. The reaction is carried out by so refluxing for a period of approximately 6 hours. The reaction mass is then cooled to 100° C. and 540 grams (30 moles) of water are added, making a water-citric ratio of 5.5. The mass is then cooled rapidly to 25° C. to 40° C. with agitation and promptly filtered to remove the resulting crystals of aconitic acid. Were the filtration delayed, a precipitation of citric acid would follow in from about 6 to 12 hours.

The yield of wet crystals is approximately 815 grams which, when purified as above described, yields 600 grams of dry aconitic acid having a purity in excess of 95%. The wet crystals contain about 13.5% of water and about 12.75% of alkane sulfonic acid, or of the latter about 105 grams. Since this amount is lost to the mother liquor, an equivalent amount of toluene-treated alkane sulfonic acid is added to the mother liquor in the amount of about 105 grams.

The wet crystals above described are purified by mixing with an equal weight of 37% hydrochloric acid, warming to 35° C., cooling, and standing for one hour. Then by strong suction the washed crystals are filtered off and heated to 100° C. until dry. The product is aconitic acid of purity upwardly from 95%.

Another way to purify to crude crystals from the reaction mass is to wash with an ice-cold saturated solution of aconitic acid. This may be used five or six times, and then may be turned back into the reaction mass.

For a second cycle, the mother liquor is also reinforced with an amount of citric acid approximately equivalent to that removed as aconitic acid, or about 630 grams of anhydrous citric acid. The reinforced mother liquor is then boiled to remove water until the boiling point rises to 130° C. to 132° C. when the reaction is continued by refluxing at this temperature for a second period of about 6 hours. The recovery of aconitic acid is effected as first described, namely, by cooling to 100° C., adding about 540 grams of water, cooling rapidly to a temperature in the range from 25° C. to 40° C. with agitation and promptly filtering off the crystals. The recovery in the second operation is higher than in the first because of an increased content of aconitic acid, not all of it being removed in the first cycle. The second cycle yields approximately 1830 grams of wet aconitic acid crystals, which when purified as described, yields about 1350 grams of aconitic acid having a purity upwardly of 95%.

The third cycle thus requires an initial addition of proportionately larger amounts of alkane sulfonic acid and of citric acid to compensate for the mechanical loss and the chemical loss, respectively. Accordingly, 236 grams of toluene-treated alkane sulfonic acid, and about 1420 grams of anhydrous citric acid, are added before boiling off the excess water. The second and third cycles establish the conditions for repeated cycling.

Under these conditions, and avoiding higher temperatures in the reaction range, the mother liquor may be reused many times by following the second-third-cycle procedure. When the vehicle accumulates undesirable color-forming bodies, it may be replaced in whole or in part by a fresh quantity of alkane sulfonic acid, which, if it is the commercial mixture, is preferably adequately treated in advance with toluene or other readily sulfonated hydrocarbon to remove traces of sulfuric acid therein.

*Example 4*

A mixture by weight consisting of 3840 parts of citric acid, 2200 parts of toluene-corrected commercial mixed monosulfonic acids of ethane, methane and n-propane, and 108 parts of water (respectively about 20, 20 and 60 moles) is heated for about 6 hours at a temperature in the range from 130° C. to 135° C., which is below the reflux temperature. It is then cooled to about 100° C. for safety and about 126 parts of water is added to provide a water-citric ratio of 6.5. The mass is then cooled quickly with agitation to a temperature in the range from 25° C. to 40° C. and the formed crystals promptly filtered. The yield is about 400 parts of wet crystals which are purified as above described.

*Example 5*

The same quantities are used as in Example 4, but the two quantities of water are combined for the reaction, thereby effecting an initial water-citric ratio of 6.5. This is heated under slight pressure to attain a temperature in the range 130° C. to 135° C. The mass is cooled to 25° C. to 40° C. and filtered. The yield is approximately the same as in Example 4.

Examples 4 and 5 point out that the reaction is not necessarily carried out by refluxing. It is the temperature that is important, however it is achieved. A refluxing mass is merely an expedient control for the reaction. Examples 4 and 5 also give low and high aquosities for the reaction, and high aquosities for the separation, but these lows and highs are not the optimum values, as already explained above.

*Modification.*—The aconitic acid is readily reduced to form HOOC.CH$_2$.CH(COOH).CH$_2$.COOH, which is tricarballylic acid. This also forms esters in the same way as aconitic acid, and such esters are likewise useful as plasticizers and intermediates.

The present invention may be carried out to form aconitic acid as described, and as it is formed it may be hydrogenated to tricarballylic acid by generating nascent hydrogen in the reaction mass. Merely by the presence of zinc or other hydrogen-producing metal during the reflux period, this may be effected. The speed of the dehydration reaction is increased as a result of lessening the opposing mass action of the formed aconitic acid. The tricarballylic acid may be recovered and purified, or esterified, in the same manner as described for aconitic acid.

Although the above procedure is possible, it is pointed out that the hydrogenation of aconitic acid is preferably effected after recovery of the aconitic acid as such. To effect the reduction as described by adding zinc or the like, contaminates the reaction liquid vehicle with metal sulfonate salts, and lessens the value of the residual liquor for reinforcement with citric acid, and reuse as described.

Nevertheless, the invention as herein set forth and as expressed in the appended claims, contemplates broadly the conversion of citric acid to aconitic acid, whether or not it is hydrogenated as formed, or is isolated as such.

Various other changes and departures from the illustrated examples are also contemplated in the appended claims.

I claim:

1. The method which comprises dehydrating dissolved citric acid to aconitic acid at a reaction temperature in the range from 120° C. to 140° C. in an aqueous liquid vehicle which is non-oxidizing toward aconitic acid and a solvent for citric acid at the reaction temperature, which vehicle comprises essentially water and a lower alkane monosulfonic acid.

2. The method which comprises dehydrating dissolved citric acid to aconitic acid at a reaction temperature in the range from 120° C. to 140° C. in an aqueous liquid vehicle which is non-oxidizing toward aconitic acid and a solvent for citric acid at the reaction temperature, which vehicle comprises essentially water and monosulfonic acid of alkane hydrocarbon selected from the group consisting of methane, ethane and propane, said vehicle being substantially free from an agent oxidizing toward aconitic acid.

3. The method which comprises dehydrating dissolved citric acid to aconitic acid at a reaction temperature in the range from 130° C. to 135° C. in an aqueous liquid vehicle which is non-oxidizing toward aconitic acid and a solvent for citric acid at the reaction temperature, which vehicle refluxes at atmospheric pressure in said temperature range, and which vehicle comprises essentially water and a lower alkane monosulfonic acid.

4. The method which comprises dehydrating dissolved citric acid to aconitic acid at a reaction temperature in the range from 130° C. to 135° C. in an aqueous liquid vehicle which is non-oxidizing toward aconitic acid and a solvent for citric acid at the reaction temperature, which vehicle refluxes at atmospheric pressure in said temperature range, and which vehicle comprises essentially water and monosulfonic acid of alkane hydrocarbon selected from the group consisting of methane, ethane and propane, said vehicle being substantially free from an agent oxidizing toward aconitic acid.

5. The method which comprises dehydrating citric acid to aconitic acid at a reaction temperature in the range from 130° C. to 135° C. in an aqueous liquid vehicle initially comprising essentially one molar weight of anhydrous citric acid, about one molar weight of monosulfonic acid of alkane hydrocarbon selected from the group consisting of methane, ethane and propane, and about four molar weights of water, said vehicle being substantially free from an agent oxidizing toward aconitic acid.

6. The method which comprises dehydrating citric acid to aconitic acid at a reaction temperature in the range from 130° C. to 135° C. in an aqueous liquid vehicle initially comprising essentially one molar weight of anhydrous citric acid, about one molar weight of monosulfonic acid of alkane hydrocarbon selected from the group consisting of methane, ethane and propane, and about four molar weights of water, said vehicle being substantially free from an agent oxidizing toward aconitic acid, refluxing the mixture for a few hours up to about 6 hours at a temperature in said reaction range, adding about one and one-half molar weights of water to the homogeneous reaction mass, cooling to a temperature in the range from 25° C. to 40° C. and separating the resulting crystals of aconitic acid.

7. The method which comprises dehydrating dissolved citric acid at a reaction temperature in the range from 120° C. to 140° C. in an aqueous liquid solvent vehicle therefor comprising essentially water and monosulfonic acid of alkane hydrocarbon selected from the group consisting of methane, ethane and propane, said vehicle having an aquosity enabling it to be refluxed at normal atmospheric pressure at a temperature in said range, and said vehicle being substantially free from an agent oxidizing toward aconitic acid, whereby citric acid is dehydrated to aconitic acid.

8. The method which comprises dehydrating citric acid at a reaction temperature in the range from 130° C. to 135° C. in an aqueous vehicle comprising essentially water and monosulfonic acid of alkane hydrocarbon selected from the group consisting of methane, ethane and propane, said vehicle having an aquosity enabling it to be refluxed at normal atmospheric pressure at a temperature in said range, and said vehicle being substantially free from an agent oxidizing toward aconitic acid, whereby citric acid is dehydrated to aconitic acid.

9. The method which comprises refluxing at a reaction temperature in the range from 120° C. to 140° C. for dehydrating citric acid to aconitic acid an aqueous liquid comprising essentially dissolved citric acid, water and monosulfonic acid of alkane hydrocarbon selected from the group consisting of methane, ethane and propane, said liquid having an aquosity enabling it to be refluxed at normal atmospheric pressure at a temperature in said range, and said liquid being substantially free from an agent oxidizing toward aconitic acid, whereby citric acid is dehydrated to aconitic acid.

10. The method which comprises refluxing at a reaction temperature in the range from 130° C. to 135° C. for dehydrating citric acid to aconitic acid an aqueous liquid comprising essentially dissolved citric acid, water and monosulfonic acid of alkane hydrocarbon selected from the group consisting of methane, ethane and propane, said liquid having an aquosity enabling it to be refluxed at normal atmospheric pressure at a temperature in said range, and said liquid being substantially free from an agent oxidizing toward aconitic acid, whereby citric acid is dehydrated to aconitic acid.

11. The method which comprises dissolving a crystal form of citric acid selected from the group consisting of anhydrous citric acid and citric acid monohydrate, in a liquid vehicle comprising essentially monosulfonic acid of an alkane hydrocarbon selected from the group consisting of methane, ethane and propane, said vehicle being substantially free from an agent oxidizing toward aconitic acid, heating the solution at a reaction temperature in the range from 120° C. to 140° C. and thereby dehydrating a substantial portion of the citric acid to aconitic acid.

12. The method which comprises forming a solution comprising essentially up to about one molar weight of anhydrous citric acid, about one molar weight of monosulfonic acid of an alkane hydrocarbon selected from the group consisting of methane, ethane and propane, and from 3 to 6.5 molar weights of water, said vehicle being substantially free from an agent oxidizing toward aconitic acid, heating the solution at a reaction temperature in the range from 120° C. to 140° C. and thereby dehydrating a portion of the citric acid to a crystallizable quantity of aconitic acid, cooling the reaction mass to a temperature effecting crystallization of aconitic acid, and separating the liquid containing unreacted citric acid from the crystals of aconitic acid.

13. The method which comprises forming a solution comprising essentially up to about one molar weight of anhydrous citric acid, about one molar weight of monosulfonic acid of an alkane hydrocarbon selected from the group consisting of methane, ethane and propane, and from 3 to 5.5 molar weights of water, said vehicle being substantially free from an agent oxidizing toward aconitic acid, heating the solution at a reaction temperature in the range from 120° C. to 140° C. and thereby dehydrating a portion of the citric acid to a crystallizable quantity of aconitic acid, cooling the reaction mass to a temperature effecting crystallization of aconitic acid, and separating the liquid containing unreacted citric acid from the crystals of aconitic acid.

14. The method which comprises forming a solution comprising essentially up to about one molar weight of anhydrous citric acid, about one molar weight of monosulfonic acid of an alkane hydrocarbon selected from the group consisting of methane, ethane and propane, and upwardly from 3 but under 5.5 molar weights of water, said vehicle being substantially free from an agent oxidizing toward aconitic acid, heating the solution at a reaction temperature in the range from 120° C. to 140° C. and thereby dehydrating a substantial portion of the citric acid to a crystallizable quantity of aconitic acid, adding more water to attain said 5.5 molar weights, cooling the reaction mass to a temperature in the range 25° C. to 40° C. to effect crystallization of aconitic acid, and separating the liquid containing unreacted citric acid from the crystals of aconitic acid.

15. The method which comprises forming a solution comprising essentially up to about one molar weight of anhydrous citric acid, about one molar weight of monosulfonic acid of an alkane hydrocarbon selected from the group consisting of methane, ethane and propane, and upwardly from 3 but under 5.5 molar weights of water, said vehicle being substantially free from an agent oxidizing toward aconitic acid, heating the solution at a reaction temperature in the range from 130° C. to 135° C. and thereby dehydrating a substantial portion of the citric acid to a crystallizable quantity of aconitic acid, adding more water to attain said 5.5 molar weights, cooling the reaction mass to a temperature in the range 25° C. to 40° C. to effect crystallization of aconitic acid, and separating the liquid containing unreacted citric acid from the crystals of aconitic acid.

16. The method which comprises forming a solution non-oxidizing toward aconitic acid containing primarily and essentially about one molar weight of citric acid, from 3 to 6.5 molar weights of water and monosulfonic acid of alkane hydrocarbon selected from the group consisting of methane, ethane and propane, said monosulfonic acid being present in quantity to render the solution refluxable at a temperature in the range from 130° C. to 135° C. at atmospheric pressure, and refluxing the mixture at said temperature for a period of time in the vicinity of 6 hours, whereby to form aconitic acid.

17. The process which comprises dehydrating dissolved citric acid to aconitic acid at a reaction temperature in the range from 120° C. to 140° C. in an aqueous liquid vehicle which is non-oxidizing toward aconitic acid and a solvent for citric acid at the reaction temperature, which vehicle comprises essentially water and monosulfonic acid of alkane hydrocarbon selected from the group consisting of methane, ethane and propane, crystallizing aconitic acid from the remaining contents of the resulting reaction mass, separating crystals from the liquor, and repeating the process by adding citric acid to the major portion of the alkane monosulfonic acid, residual citric acid and dissolved aconitic acid in said liquor.

HOY A. CRANSTON.

REFERENCES CITED

The following references are of record in the file of this patent:

Pawolleck et al., Beilstein (Handbuch, 4th Ed.), vol. II, page 850 (1920).

Umbdenstock et al., Ind. and Eng. Chem., vol. 37, pp. 963–967 (1945).